(12) United States Patent
Fast et al.

(10) Patent No.: US 9,316,899 B2
(45) Date of Patent: Apr. 19, 2016

(54) STRAIN RELIEVED MOUNTING METHOD AND APPARATUS FOR SCREEN MATERIAL

(71) Applicant: RealD Inc., Beverly Hills, CA (US)

(72) Inventors: Harrison Fast, Boulder, CO (US); David A. Coleman, Louisville, CO (US); Mark DiLullo, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/619,719

(22) Filed: Feb. 11, 2015

(65) Prior Publication Data

US 2015/0227034 A1    Aug. 13, 2015

Related U.S. Application Data

(60) Provisional application No. 61/938,304, filed on Feb. 11, 2014.

(51) Int. Cl.
*G03B 21/58* (2014.01)
*G03B 21/56* (2006.01)

(52) U.S. Cl.
CPC .............. *G03B 21/58* (2013.01); *G03B 21/56* (2013.01); *Y10T 16/088* (2015.01)

(58) Field of Classification Search
CPC ....... G03B 21/56; G03B 21/58; Y10T 16/088
USPC ...................................................... 359/443
See application file for complete search history.

(56) References Cited

U.S. PATENT DOCUMENTS

| 6,008,938 | A | * | 12/1999 | Suehle et al. | 359/443 |
|---|---|---|---|---|---|
| 7,872,802 | B2 | * | 1/2011 | Seymour | 359/461 |
| 2007/0267332 | A1 | | 11/2007 | Cady et al. | |
| 2008/0037117 | A1 | | 2/2008 | Seki et al. | |
| 2009/0109530 | A1 | | 4/2009 | Michimori et al. | |
| 2010/0053747 | A1 | * | 3/2010 | Maruyama | 359/443 |
| 2011/0157695 | A1 | * | 6/2011 | Katsenelenson et al. | 359/449 |
| 2011/0261450 | A1 | * | 10/2011 | Howes et al. | 359/443 |
| 2014/0063600 | A1 | * | 3/2014 | Sharp et al. | 359/446 |

FOREIGN PATENT DOCUMENTS

EP    1534519 B1    3/2012

OTHER PUBLICATIONS

International search report and written opinion of international searching authority in co-pending PCT/US2015/015411.

* cited by examiner

*Primary Examiner* — Christopher Mahoney
(74) *Attorney, Agent, or Firm* — Neil G. J. Mothew

(57) ABSTRACT

A method of mounting screen material may include a screen mounted to a frame at multiple mounting points. One embodiment may include mounting patches attached along the perimeter of the screen. These mounting patches may be strain relieved in order to enable rolling the screen without sacrificing the in-plane rigidity of the patches when the screen is mounted to a frame. Stated differently, the strain relieved patches may reduce the strain on the screen in the circumstance the screen is rolled onto a core. The mounting patches may be strain relieved by locating notches or slits in the mounting patch.

26 Claims, 12 Drawing Sheets

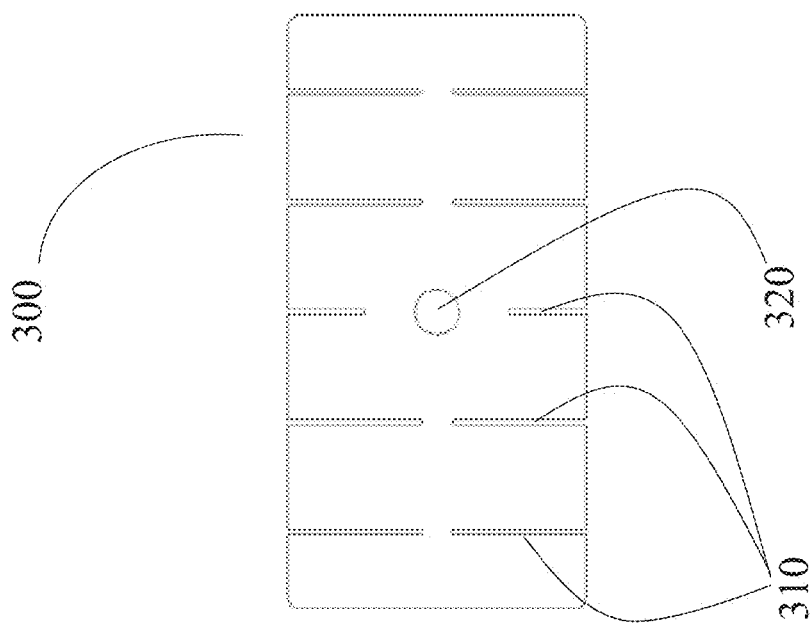
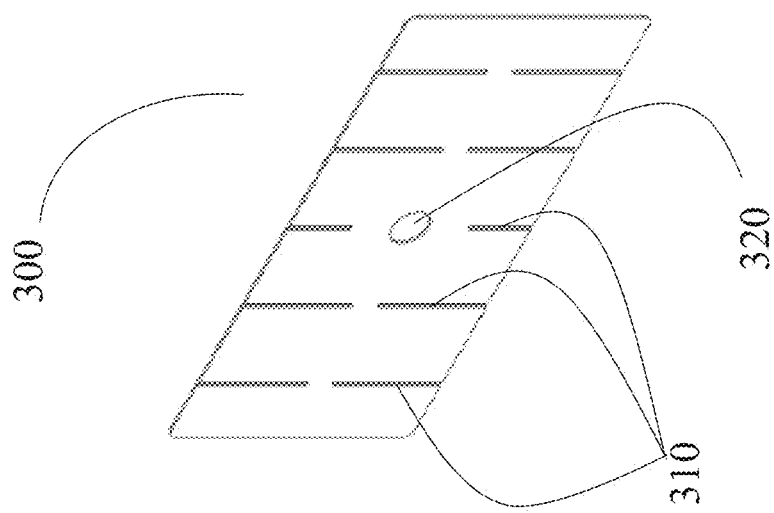

STRAIN RELIEVED MOUNTING METHOD AND APPARATUS FOR SCREEN MATERIAL

CROSS-REFERENCE TO RELATED APPLICATIONS

This application claims priority to and is related to U.S. Provisional Patent Application No. 61/938,304, entitled "Strain relieved mounting method for screen material," filed Feb. 11, 2014, which is herein incorporated by reference. This application is also related to U.S. patent application Ser. No. 14/020,654, entitled "High elastic modulus projection screen substrates", filed Sep. 6, 2013, the entirety of which is herein incorporated by reference.

TECHNICAL FIELD

The present disclosure generally relates to projection screens, and more specifically to two dimensional and three dimensional projection screens and related components.

BACKGROUND

Generally, current projection and display technologies may include functionality to deploy, view and/or display three dimensional ("3D") content. Recently, the increased demand for such functionality has driven the need for enhanced performance and development of projection and display technology. The choice of projection screen substrates has evolved over time to facilitate easy shipping and installation. The current best solution for matte white screens is a highly flexible plasticized PVC substrate that is tolerant of relatively crude installation techniques. However, as the optical functionality requirements for the screen surface have increased, the need for a more mechanically functional substrate has also increased. Accordingly, the need for installation techniques and mounting methods for substrates has become increasingly important.

BRIEF SUMMARY

A method of mounting screen material may include a screen mounted to a frame at multiple mounting points. One embodiment may include mounting patches attached along the perimeter of the screen. These mounting patches may be strain relieved in order to enable rolling the screen without sacrificing the in-plane rigidity of the patches when the screen is mounted to a frame. Stated differently, the strain relieved patches may reduce the strain on the screen in the circumstance the screen is rolled onto a core. The mounting patches may be strain relieved by locating notches or slits in the mounting patch.

According to the present disclosure, a projection screen may include a first substrate and a second substrate. Each of the first substrate and the second substrate may have at least a first seaming edge and a first mounting edge, and the first seaming edge of the first substrate may be joined together with the first seaming edge of the second substrate to form a seam. The projection screen may also include a first mounting patch attached to at least the first substrate panel and the first mounting patch may have at least one strain relief element. The strain relief element may reduce strain about a vertical axis, and the first mounting patch may distribute a mechanical load across at least the first substrate so that the strain lines in the first substrate are optically approximately at or around a just noticeable difference. The first mounting patch may have a first edge that approximately aligns with at least the mounting edge of the first substrate. The first mounting patch may include an attachment feature that may attach a mechanical load to at least the first substrate and the attachment features may be a hole in the first mounting patch. In one embodiment, the first mounting patch may be mounted on the back side of the first substrate panel. Additionally, the first mounting patch may be a substantially similar material to the first and second substrate panels. The first and second substrate panels may be PET and the first mounting patch may be PET. The coefficient of thermal expansion of the first mounting patch may be within approximately 10-15 percent of the coefficient of thermal expansion of the first and second substrate panels. The projection screen may include a second mounting patch which may be attached to and overlapping the seam formed by joining the first substrate panel and the second substrate panel. Further, the projection screen may include a third mounting patch which may be attached to the second seaming edge opposite the first seaming edge of the first substrate panel. The fasteners may attach to the third mounting patch and place the first substrate panel under a mechanical load in an approximately horizontal direction. The attachment feature of the first mounting patch may not overlap the first substrate panel. Additionally, the first mounting patch thickness may be at least approximately 2.5 times stiffer in plane than the first substrate panel.

According to another embodiment of the present disclosure, a strain relieved patch for attachment to a projection screen may include a substrate and strain relief features for reducing strain in the substrate of the strain relieved patch around an approximately vertical axis while substantially maintaining in plane rigidity. The strain relieved path may also include an attachment feature that may allow attachment of a mechanical load and the strain relieved patch approximately evenly distributes a mechanical load applied to the attachment feature. The strain relieved path may also include an adhesive affixed to the strain relieved patch for mounting the strain relieved patch to a substrate. The attachment feature may be approximately circular and form a hole through the strain relieved patch. The strain relief features may be elongated features and may form an elongated hole through the strain relieved patch. In another embodiment, the strain relief features may score the surface of the strain relieved patch and may not pass completely through the strain relieved patch. The strain relief features may be elongated and may be located on the top and the bottom edges of the strain relieved patches. In a different embodiment, the strain relief features may be centered toward the approximately vertical middle of the strain relieved patch and may not extend to the edges of the strain relieved patch. The strain relief features may reduce the tensile stiffness of the strain relieved patch by less than approximately 40 percent when compared to a similar patch without strain relief features. Additionally, the strain relief features may reduce the bending stiffness of the strain relieved patch in the approximate range of 50-90 percent when compared to a similar patch without strain relief features. The strain relieved patch may be PET and the thickness of the strain relieved patch may be in the approximate range of 10-80 mils thick. The adhesive may be an ultra violet crosslinking adhesive. In one embodiment, the strain relief features may be on the top of the substrate and may be offset from the strain relief features on the bottom of the substrate. The attachment feature may be reinforced with a grommet and the grommet may be metal.

According to another embodiment of the present disclosure, a projection screen system may include a frame, a projection screen which may be attached to the frame by fasteners and the fasteners may attach to mounting patches adjacent to the projection screen. The mounting patches may include elongated notches that may relieve strain about a vertical axis and attachment holes and the fasteners may attach to the mounting patches via the attachment holes. Additionally, the fasteners may place the mounting patch under a mechanical load and the mounting patch may substantially evenly distribute the mechanical load throughout the projection screen so that strain lines of the mechanical load across the projection screen may be optically approximately around a just noticeable difference. In one embodiment, the fasteners are springs. Additionally, the attachment holes on the mounting patches may not overlap the projection screen. In another embodiment, the mounting patch may include an actuator attachment area and the actuator attachment area may not overlap the projection screen. Further, magnets may be attached to the mounting patch for attaching an actuator to the mounting patch.

BRIEF DESCRIPTION OF THE DRAWINGS

Embodiments are illustrated by way of example in the accompanying figures, in which like reference numbers indicate similar parts, and in which:

FIGS. 3A and 3B are schematic diagrams illustrating an embodiment of a strain relieved patch, in accordance with the present disclosure;

DETAILED DESCRIPTION

Figure 1:
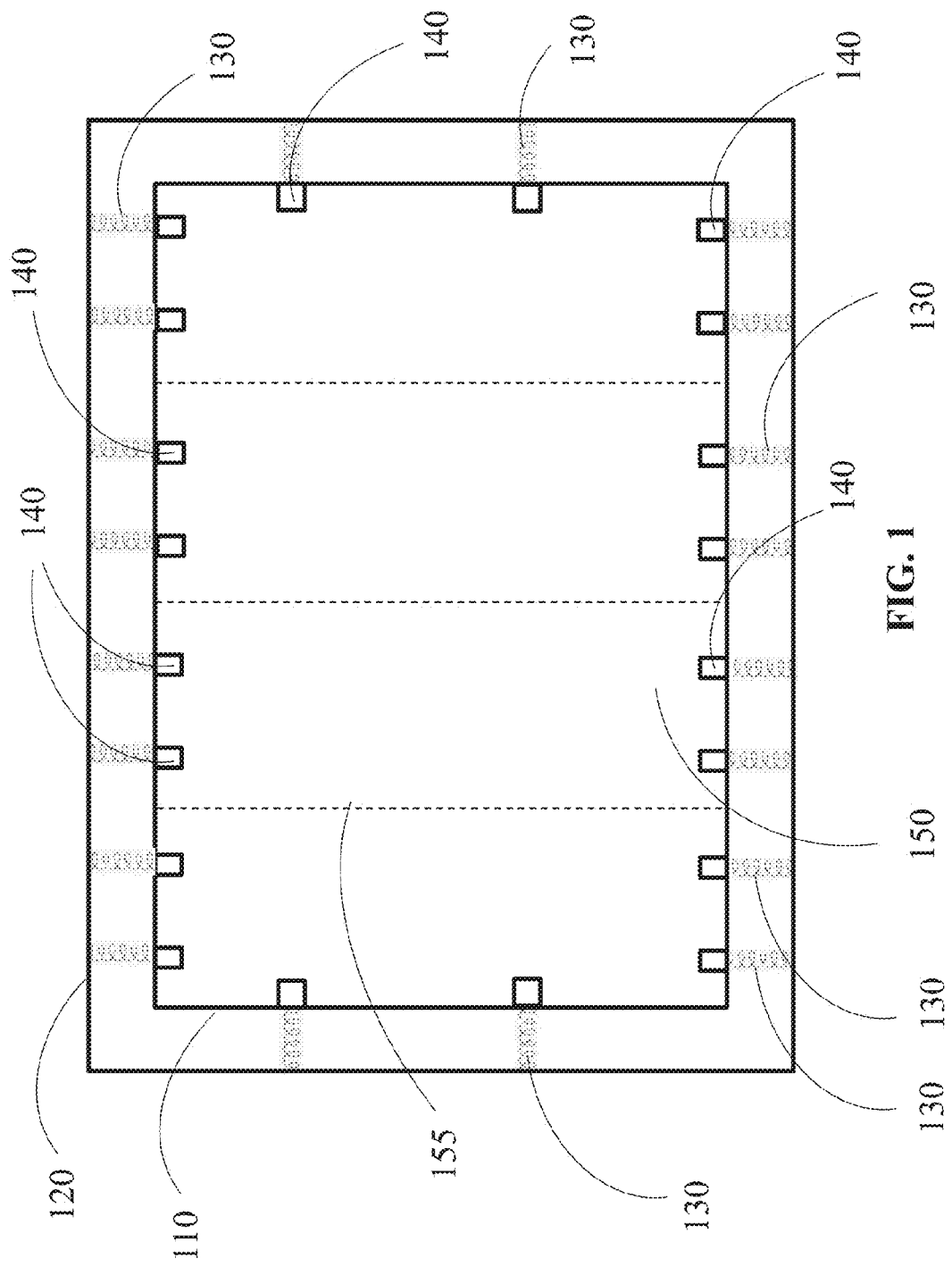
FIG. 1 is a schematic diagram illustrating an embodiment of a mounted screen with mounting patches, in accordance with the present disclosure.

Generally, one embodiment of the present disclosure may take the form of a projection screen for mounting to a frame. The projection screen may be formed from screen substrate and the projection screen may have at least a first edge and a second edge. The projection screen may also include a plurality of mounting patches proximate to at least one of the first edge or the second edge. The mounting patches may have strain relief notches operable to relieve strain on the projection screen and further operable to substantially uniformly distribute mechanical load lines propagating into the screen substrate.

According to the present disclosure, a projection screen system may include a first substrate and a second substrate. Each of the first substrate and the second substrate may have at least a first seaming edge and a first mounting edge, and the first seaming edge of the first substrate may be joined together with the first seaming edge of the second substrate to form a seam. The projection screen system may also include a first mounting patch attached to at least the first substrate panel and the first mounting patch may have at least one strain relief element. The strain relief element may reduce strain about a vertical axis, and the first mounting patch may distribute a mechanical load across at least the first substrate so that the strain lines in the first substrate are optically approximately at or around a just noticeable difference. The first mounting patch may have a first edge that approximately aligns with at least the mounting edge of the first substrate. The first mounting patch may include an attachment feature that may attach a mechanical load to at least the first substrate and the attachment features may be a hole in the first mounting patch. In one embodiment, the first mounting patch may be mounted on the back side of the first substrate panel. Additionally, the first mounting patch may be a substantially similar material to the first and second substrate panels. The first and second substrate panels may be PET and the first mounting patch may be PET. The coefficient of thermal expansion of the first mounting patch may be within approximately 10-15 percent of the coefficient of thermal expansion of the first and second substrate panels. The projection screen system may include a second mounting patch which may be attached to and overlapping the seam formed by joining the first substrate panel and the second substrate panel. Further, the projection screen system may include a third mounting patch which may be attached to the second seaming edge opposite the first seaming edge of the first substrate panel. The fasteners may attach to the third mounting patch and place the first substrate panel under a mechanical load in an approximately horizontal direction. The attachment feature of the first mounting patch may not overlap the first substrate panel. Additionally, the first mounting patch thickness may be at least approximately 2.5 times stiffer in plane than the first substrate panel.

According to another embodiment of the present disclosure, a strain relieved patch for attachment to a projection screen may include a substrate and strain relief features for reducing strain in the substrate of the strain relieved patch around an approximately vertical axis while substantially maintaining in plane rigidity. The strain relieved path may also include an attachment feature that may allow attachment of a mechanical load and the strain relieved patch approximately evenly distributes a mechanical load applied to the attachment feature. The strain relieved path may also include an adhesive affixed to the strain relieved patch for mounting the strain relieved patch to a substrate. The attachment feature may be approximately circular and form a hole through the strain relieved patch. The strain relief features may be elongated features and may form an elongated hole through the strain relieved patch. In another embodiment, the strain relief features may score the surface of the strain relieved patch and may not pass completely through the strain relieved patch. The strain relief features may be elongated and may be located on the top and the bottom edges of the strain relieved patches. In a different embodiment, the strain relief features may be centered toward the approximately vertical middle of the strain relieved patch and may not extend to the edges of the strain relieved patch. The strain relief features may reduce the tensile stiffness of the strain relieved patch by less than approximately 40 percent when compared to a similar patch without strain relief features. Additionally, the strain relief features may reduce the bending stiffness of the strain relieved patch in the approximate range of 50-90 percent when compared to a similar patch without strain relief features. The strain relieved patch may be PET and the thickness of the strain relieved patch may be in the approximate range of 10-80 mils thick. The adhesive may be an ultra violet crosslinking adhesive. In one embodiment, the strain relief features may be on the top of the substrate and may be offset from the strain relief features on the bottom of the substrate. The attachment feature may be reinforced with a grommet and the grommet may be metal.

According to another embodiment of the present disclosure, a projection screen system may include a frame, a projection screen which may be attached to the frame by fasteners and the fasteners may attach to mounting patches adjacent to the projection screen. The mounting patches may include elongated notches that may relieve strain about a vertical axis and attachment holes and the fasteners may attach to the mounting patches via the attachment holes. Additionally, the fasteners may place the mounting patch under a mechanical load and the mounting patch may substantially evenly distribute the mechanical load throughout the projection screen so that strain lines of the mechanical load across the projection screen may be optically approximately around a just noticeable difference. In one embodiment, the fasteners are springs. Additionally, the attachment holes on the mounting patches may not overlap the projection screen. In another embodiment, the mounting patch may include an actuator attachment area and the actuator attachment area may not overlap the projection screen. Further, magnets may be attached to the mounting patch for attaching an actuator to the mounting patch.

Recently, significant optical improvements in projection screen performance have been realized by using continuously embossed plastic film, as generally described in U.S. Pat. No. 7,898,734, which is herein incorporated by reference in its entirety. Such screens allow, among other features, unprecedented control over the distribution of light, improved light polarization maintenance, and higher reflection efficiency. Additionally, the high modulus substrate (and coat-before-converting process flow) enables laser drilled micro perforations approximately less than 300 microns in diameter, as generally described in U.S. patent application Ser. No. 13/786,092, which is herein incorporated by reference in its entirety. The high modulus substrate may also support mechanical vibrations which may be highly useful in mitigating speckle arising from coherent illumination, as generally described in U.S. patent application Ser. No. 14/020,654, which is herein incorporated by reference in its entirety.

Due to the substrate material, handling and tensioning of the screens may become more difficult, as generally described in U.S. patent application Ser. No. 14/020,654. Unlike the conventionally used highly-plasticized vinyl of standard projection screens, the high modulus screen may form a kink if bent beyond some minimum radius, thus additional care may be appropriate when handling these screens. Furthermore, additional care may be appropriate when attaching the screen to a frame in order to avoid visible wrinkles.

As generally disclosed in U.S. patent application Ser. No. 14/020,654, one method of preventing wrinkles within the screen may be to attach a continuous mechanical strip along the bottom and top of the screen. This strip may serve to distribute the mechanical load on the screen. The strip may be effective at approximately five times thicker than the screen substrate and approximately 3-4 inches in height. The strip may also be approximately aligned with the edge of screen such that both the strip and screen may be under similar or approximately equal load. Because of these mechanical specifications, it is highly desirable to attach the strips to the screen substrate in a controlled environment, for example, prior to installation in the theater. The terms strip, mounting strip, mechanical strip, and variations thereof may be used interchangeably herein for discussion purposes only.

For cinema sized screens with the strip or large screens with the strip, it may be appropriate to roll the screen with the strip onto a core for shipping. Because the mounting strip may be significantly thicker than the substrate, the strip may place a large stress on the screen when the assembly is rolled onto a core. In order to balance this stress, it may be appropriate to apply the strip to both the front and back surface of the screen. This complicates the assembly procedure and is only partially effective in eliminating stress. The terms screens with strip, screen assembly, and assembly may be used interchangeably herein.

A method of mounting screen material addressing the aforementioned issues will be discussed herein. FIG. 1 illustrates a mounted projection screen system 100. As illustrated in FIG. 1, a projection screen 110 may be mounted or attached to a frame 120. FIG. 1 also illustrates substrate panels 150 adjacent to one another to form seams 155. FIG. 1 illustrates one example of a fastener 130 which may attach the projection screen to the frame. The projection screen 110 may be attached to the frame 120 using any type of appropriate fastener such as a spring, hook, tensioned line, cord, elastic cord, wire, any combination thereof, and so forth.

The fastener 130 may secure the screen to the frame via mounting patches 140 which may be attached to the projection screen. Although the mounting patches 140 are attached toward the center of the substrate panels 150 in FIG. 1, the mounting patches 140 may be located or placed on top of the seams 155. Additionally, the mounting patches 140 are illustrated on the front of the screen in FIG. 1, however, the mounting patches may be attached to the perimeter of the screen on the front side of the screen only, the back side of the screen only, or both. In the example a screen includes mounting patches on the front side and the back side of the screen, the patches and the notches need not be aligned to one another. The mounting patches may have attachment features or mounting holes that allow the fasteners 130 to secure the screen to the frame. In one embodiment, the mounting holes may overlap the projection screen, thus the fasteners may attach to a mounting hole that passes through both the mounting patch 140 and the projection screen substrate. The mounting patch, fasteners, and attachment features will be discussed in further detail below. Additionally, the mounting patches may include strain relief notches or slits. The terms mounting patch, patch, strip patch, mounting strip patch, mechanical strip patch, strain relieved patch, any combination thereof, and so forth may be used interchangeably for discussion purposes only and not for limitation.

Another embodiment includes adhesive patches attached along the perimeter of the screen on the back side of the screen only. The patches may be smaller pieces of the mechanical strip previously discussed. These patches may be strain relieved in order to enable rolling of the screen without sacrificing in-plane rigidity. Stated differently, the strain relieved patches may reduce the strain on the screen when the screen is rolled onto a core. The notches in the strain relieved mounting patches may reduce the bending stiffness of the patch in the approximate range of 50-90% when compared to a mounting patch without notches or slits. Additionally, the reduction in tensile stiffness of a patch with notches may be less than approximately 40% than a patch with no notches. Strain relief may be implemented such that the mechanical deformation of patches due to stresses incurred during the storage and shipping of screens may not impose a substantial additional deformation onto the screen substrate upon the removal of loading. The stiffness of the patch should not be so great so as to substantially shape the bulk substrate.

The mounting patches may have slits in the top and bottom edges of the patch or the slits may be towards the middle of the patch and may not extend to the edges of the patch. Additionally, although the patches illustrate the notches or slits aligned from the first edge to the second edge, the slits may be offset or interleaved with one another with respect to the first and second edges.

Figure 2:
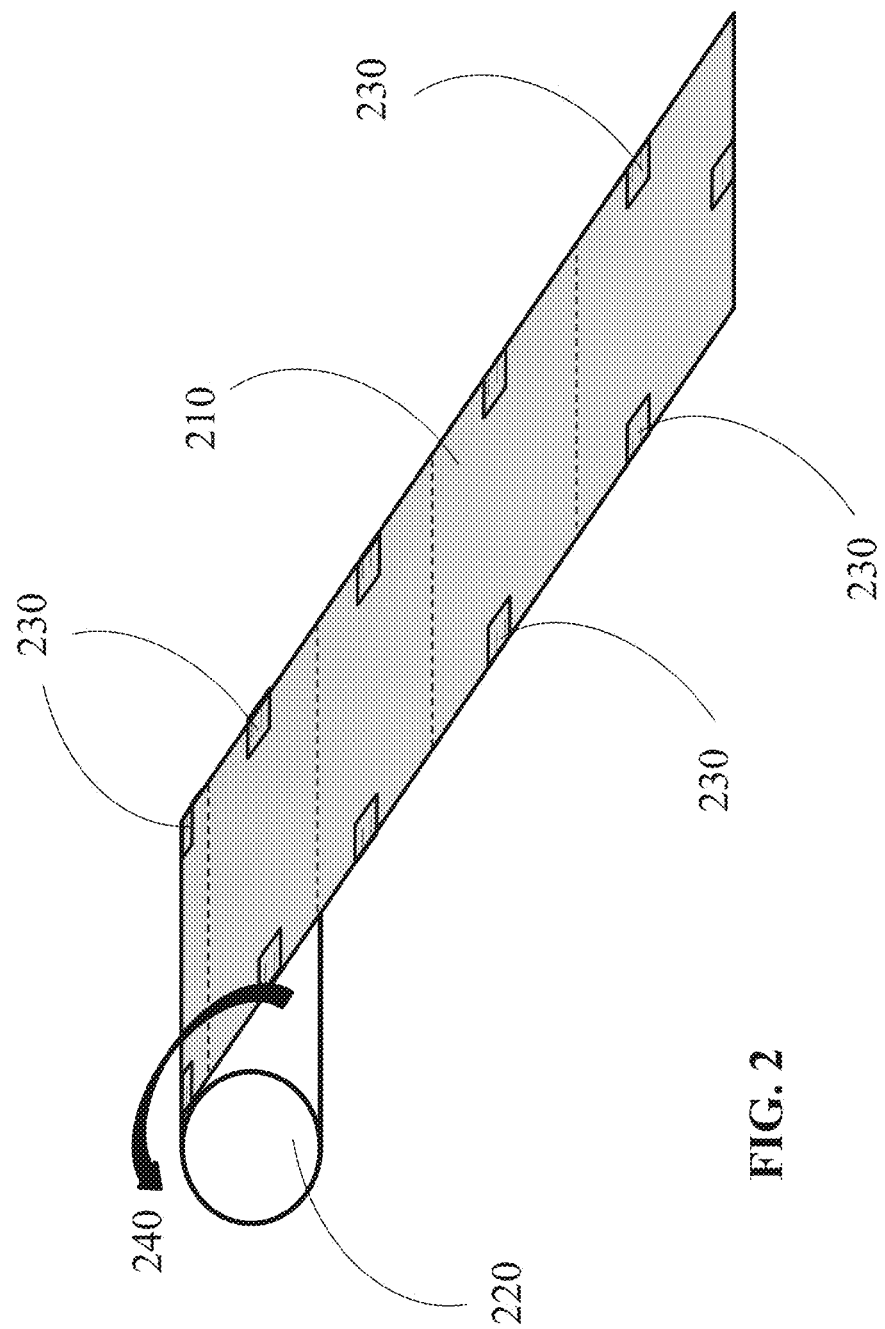
FIG. 2 is a schematic diagram illustrating an embodiment of a mounted screen with mounting patches rolled on a core, in accordance with the present disclosure.

FIG. 2 illustrates a projection screen 210 partially rolled onto a core 220 in the direction 230. The strain relief mounting patches 230 have strain relief features or notches that allow the mounting patches 230 to maintain adhesion to the projection screen 210 while it is being rolled onto a core 220. The terms notches, strain relief features, strain relief elements, strain relief notches, strain relief slits, strain relief notches, slits, and so forth, may be used interchangeably for discussion purposes only. Additionally, as illustrated in FIG. 2, the mounting patches have 2 strain relief notches. Generally, there may be any number of strain relief notches per patch, which may be centered, symmetric, or asymmetric, and so forth, with respect to the mounting patch. Furthermore, the strain relief notches may be approximately perpendicular to the direction that the screen is being rolled onto the core, or approximately parallel to the long axis of the core upon which the screen with the mounting patches is being rolled on. Stated differently, the strain relief is generally aligned to the long axis of the core upon which the screen substrate will be rolled onto.

The spacing of the strain relief notches depends on the relative thickness of the screen substrate and the mounting patch. As previously mentioned, the spacing of the notches may be such that, the strain is sufficiently removed from the patch/screen interface once the screen assembly is rolled onto a core. Insufficient notch spacing may be evidenced by the patch becoming delaminated from the screen when the screen assembly is rolled onto a core, by the screen seams popping apart when the screen assembly is rolled onto a core, and so on. Insufficient strain relief may occur due to insufficient spacing between the notches and due to insufficient notch size including width and height. Notch sizes may vary from nearly zero in the case of a die or laser "slit" configuration up to approximately 25 percent of overall patch height. Remaining web dimensions should be substantially minimized such that the total patch stiffness does not result in plastic deformation of the substrate at the maximum strain encountered while wrapping around a core of 6-14 inches. This may be based on the material modulus. Furthermore, if there are too many notches, the mounting patch may not distribute the mechanical load of the attachment feature and if there are too few notches, the bending stiffness of the mounting patch may not be sufficient and the mounting patch may delaminate from the screen when the screen is rolled onto a core. In one example, the notches may be approximately 0.2 inches wide by 1.5 inches tall full round. Spacing between the notches may be approximately 0.6 inches center to center. Patch thickness may be approximately 0.03 inches. Free web height may be 0.4 inches and there may be two of these, for example, top and bottom. Patch height may be 2.5 inches not including the attachment feature or mounting tab. The patch width may be approximately 4 inches.

In one example, an approximately 20×40 foot screen may have a PC substrate and may be rolled onto a core which may be in the approximate range of 8-18 inches in diameter. In this example, the screen substrate may be approximately seven mils thick and the mounting patches may be PC and may be in the approximate range of 10-30 mils thick. Continuing the example, the patches may be approximately 2.5×4 inches and have an approximate range of notches on each of a first side and second side between approximately 1-10 notches on each side in which the first and second side are opposite sides from one another. In one example, the patches may be nominally spaced at approximately 10 inches center to center to provide substantial tensioning points for substantially even load distribution into the screen substrate. This may provide 48 patches top and bottom and 24 patches on either side for a total of 144 patches. Even though the notches are illustrated as located on the edges of the mounting patches, the notches or slits may be located towards the middle of the patch and may not extend to the edges of the patch. The patches may be polycarbonate ("PC"), polyethylene terephthalate ("PET"), polyethylene naphthalate ("PEN"), Acrylic or polymethyl methacrylate ("PMMA"), cyclic olefin copolymer ("COC"), or any other similar material, and may be in the approximate range of 10-80 mils thick. Generally, the patch may be any material that has a coefficient of thermal expansion that is within approximately 10-15 percent of the screen substrate. The tensile yield load of the substrate from the mechanical load of the springs on the attachment points may be approximately 30 lbs per linear foot.

Additionally, the spacing of the notches in the patch may be such that each of the mounting patches may maintain appropriate in-plane rigidity. Stated differently, the tensile yield load of a remaining web or substrate may be a least approximately 10 times the expected load applied to the screen substrate. This load may be in the approximate range of 5-15 lbs per linear foot per patch. Sufficient in-plane rigidity may distribute point loads and eliminate wrinkles in the screen substrate under load. For example, a patch with appropriately spaced notches may be said to maintain in-plane rigidity, when the distribution from the mechanical load, such as a spring, is appropriately distributed across the screen substrate. This may be evinced by the load lines propagating in the substrate, being approximately at or around a just noticeable difference on the screen substrate. A just noticeable difference may be understood as at or around approximately one percent differential of the mean intensity. Stated differently, an appropriately spaced notch may distribute the mechanical load so that an observer may not be able to detect the mechanical load lines propagating into the screen substrate when the screen is mounted under a mechanical load.

In one example, once the patches are attached to the screen, the slits in the top and bottom edges of the patches may be approximately perpendicular to the screen edge. Although the strain relief notches may be off perpendicular to the screen edge, the slits may be aligned so that the patch relieves the strain on the screen substrate. Further, the patches may be attached to the back side of the screen using an adhesive which may be a long term or substantially permanently bonded polymer such as a UV adhesive, two-part adhesive, cyanoacrylate adhesive, thermally bonded adhesive, chemically bonded adhesive, and so forth. The surface of the patch may be roughed up to increase the bond between the mounting patch surface and the screen surface.

In general, cinema projection screens are attached to a frame through a finite number of mounting points. The screen may have a series of grommets along its perimeter and the grommets may serve as attachment points for the screen to a frame. The screen may be attached to the frame using any number of components, such as, but not limited to a spring, hook, tensioned line, cord, elastic cord, wire, any combination thereof, and so forth. An example attachment component of the screen to the frame may distribute this series of point loads substantially uniformly over the edge of the screen. At the same time, the attachment component may not resist rolling of the assembly onto a core. Therefore, an attachment component may have relatively high in-plane stiffness but little out of plane stiffness. Thus, this attachment component may be a section of plastic substrate, which may be thicker than the screen substrate. The attachment component or mounting patch may have strain relief notches cut in it as shown in FIGS. 3A and 3B.

FIGS. 3A and 3B are schematic diagrams illustrating one embodiment of a strain relieved patch or mounting patch. As illustrated in FIGS. 3A and 3B, a mounting patch 300 may include strain relieved elements 310 and an attachment feature 320. The attachment feature 320 illustrated in FIGS. 3A and 3B as a hole, may be punched through both the strain relieved or mounting patch and the screen substrate. The attachment feature 320 may serve as an attachment point for spring, hook, tensioned line, cord, elastic cord, wire, any combination thereof, and so forth. Although the attachment feature or hole is illustrated as approximately circular, the attachment feature may be any shape that allows the mounting patch to distribute the mechanical load appropriately through the screen. For example, a spring may be used to attach the screen to a mounting frame via the attachment feature or attachment point in the strain relieved patch.

Figure 4B:
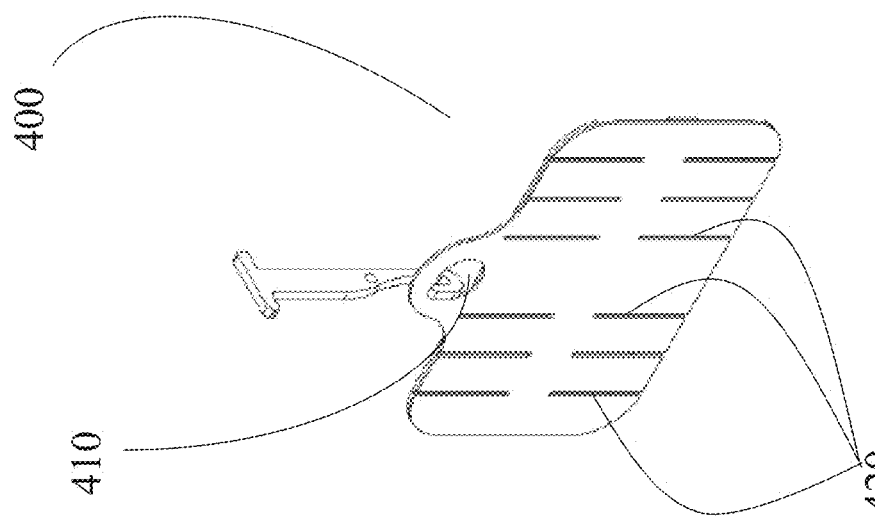
FIGS. 4A and 4B are schematic diagrams illustrating an embodiment of a strain relieved patch with a mounting hole outside the substrate surface area, in accordance with the present disclosure.
Figure 4A:
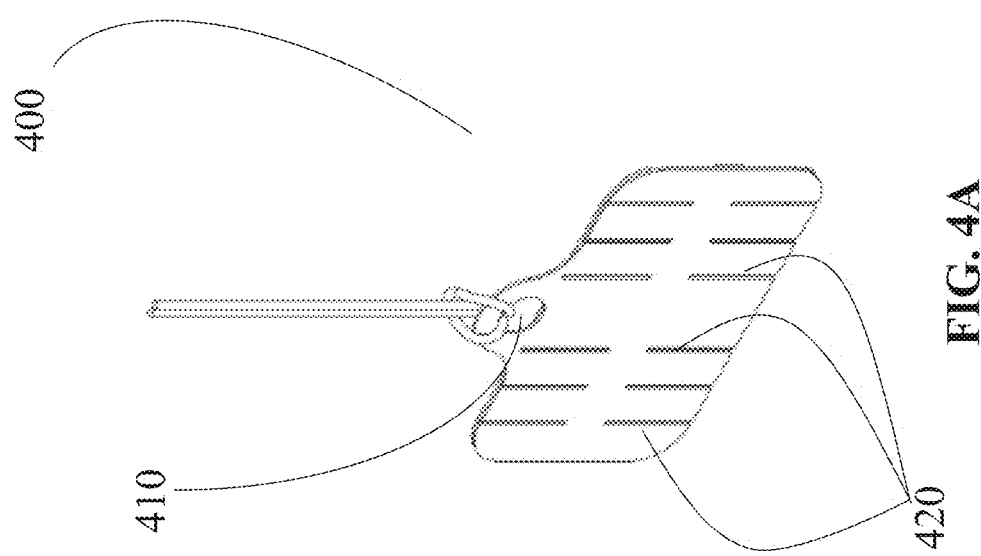

Additionally, the assembly step may be simplified if the patch includes an external loop as shown in FIGS. 4A and 4B. Although the mounting patch 300 is illustrated in FIGS. 3A and 3B as approximately rectangular, the mounting patch may be any shape, including, but not limited to, square, quadrilateral, oval, circular, triangular, an asymmetric shape, and so forth. Additionally, the hole is illustrated as being toward the edge of the screen or not overlapping with the screen, however, the hole may be located at almost any area on the patch, so long as the mechanical load may be distributed through the screen substrate when the screen is mounted. Further, the corners of the mounting patch 300 need not be rounded as illustrated and may be squared off or at any angle that appropriately reduces the strain and that substantially evenly distributes the mechanical load at the attachment feature through the screen substrate when the screen is mounted.

In one example, the strain relieved elements 310 of FIGS. 3A and 3B are illustrated as elongated notches in the mounting patch 300 and extend to the edges of the mounting patch 300. The strain relieved elements may be any shape so long as the strain is relieved when curving the mounting patch about a vertical axis, while substantially maintaining in plane rigidity. More specifically, the strain relieved elements may reduce the strain in the mounting patch when a screen with the mounting patches is rolled onto a core and curved as illustrated in FIG. 2 or when a projection screen with the mounting patches is mounted on a curved frame. In another example, the strain relieved elements may be a series of holes that are not connected to one another. In yet another example, the strain relieved elements may be scored elements that are partial grooves in the surface of the mounting patch, but that do not pass all the way through the mounting patch.

Also illustrated in FIGS. 4A and 4B are various methods of attaching the mounting patch, via the attachment element, to a frame. FIGS. 4A and 4B illustrate the use of an elastic cord and a hook, respectively, for the purposes of discussion only and not of limitation. As previous discussed, the attachment feature 410 may serve as an attachment point for a spring, hook, tensioned line, cord, elastic cord, wire, any combination thereof, and so forth.

FIGS. 4A and 4B are schematic diagrams illustrating one embodiment of a strain relieved patch with a mounting hole or attachment element outside the screen substrate surface area. As illustrated in FIGS. 4A and 4B, the mounting patch 400 includes an attachment element or mounting hole 410 that is outside the substrate surface area. Stated differently, when the mounting patch 400 is attached to a projection screen, the mounting hole 410 may not overlap the projection screen substrate. Additionally, the spacing of the strain relief notches 420 may depend on the relative thickness of the screen substrate and the strain relieved patch. In FIGS. 4A and 4B, the strain relief notches are illustrated as approximately aligned with one another from the top of the mounting patch to the bottom of the mounting patch. In another embodiment, the strain relief notches may not be aligned but offset from one another.

As previously discussed, the mounting hole may be internal to the screen or overlapping with the screen substrate, and it may be possible to use pressure sensitive adhesive (PSA) for the attachment. However, when the mounting hole does not overlap with the screen substrate, creep of the mounting patch relative to the screen may still be a problem. If the mounting hole does not overlap with the screen substrate, then creep may become more likely. Additionally, the PSA on the mounting patch may delaminate from the screen substrate once the screen/mounting patch assembly is rolled onto a core, even with the strain-relief features. Delamination may be prevented by using a permanent adhesive such as a UV crosslinking PSA, cyanoacrylate, UV crosslinking adhesive, thermoset adhesive, ultrasonic welding, any combination thereof, and so forth. Thermal adhesive, ultrasonic welding, and UV crosslinking adhesive each have the advantage of being dry processes.

Figure 5:
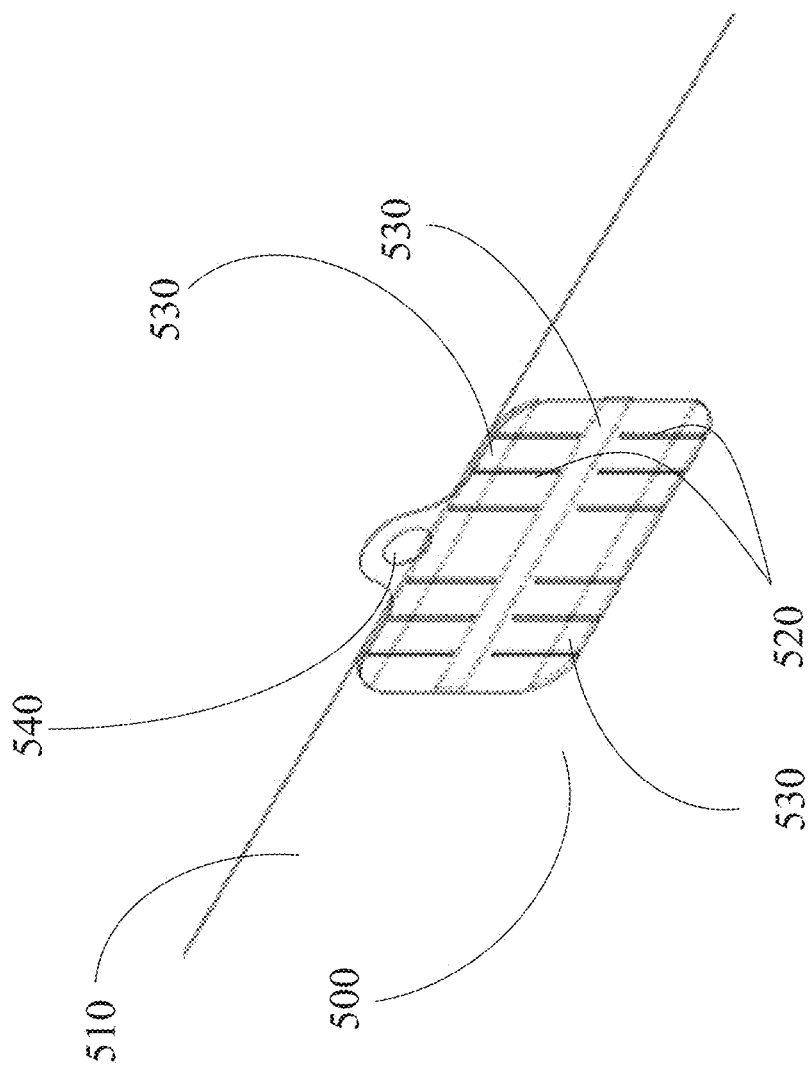
FIG. 5 is a schematic diagram illustrating an embodiment of a strain relieved patch with strips of adhesive, in accordance with the present disclosure.

FIG. 5 is a schematic diagram illustrating one embodiment of a strain relieved patch with narrow strips of adhesive. Further, FIG. 5 illustrates a patch with three strips of adhesive on the patch located so that the patch may be sufficiently attached to the screen substrate. FIG. 5 illustrates a mounting patch 500 attached to a screen substrate 510. The mounting patch 500 has strain relief elements 520 and adhesive strips 530. In some cases in which the adhesive proves to be expensive, it may be beneficial to apply the adhesive in narrow strips to the mounting patch, as shown in FIG. 5. This may enable sufficient connection to the screen and distribute the point load while minimizing cost. Similar to other embodiments discussed herein, the patches of FIG. 5 may be strain relieved by providing notches in the mounting patches. The relatively high in-plane stiffness of the attachment patch then serves to propagate the vibration into the screen. Additionally illustrated in FIG. 5 is an attachment element 540. The attachment element 540, in this example, does not overlap the screen substrate 510. The in-plane stiffness may be approximately 2.5 times the base substrate tensile stiffness. In one example, a PET patch may be four inches wide and be intended to transfer a mechanical load into 10-12 inches of a PET screen substrate, and may be at least 2.5 times stiffer in plane, than the substrate.

Figure 6A:
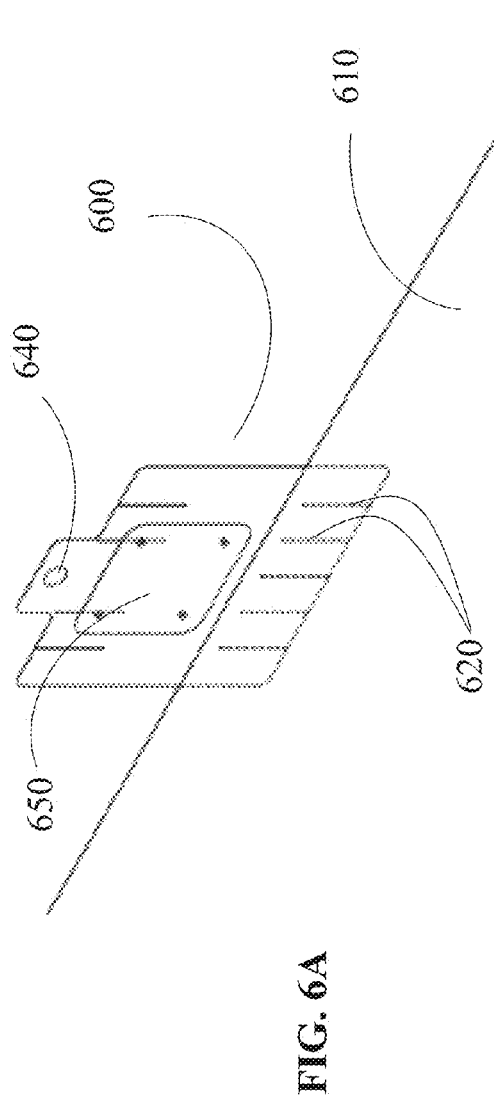
FIGS. 6A, 6B, and 6C are schematic diagrams illustrating an embodiment of a mounting patch with area for mounting a mechanical actuator external to a substrate, in accordance with the present disclosure.
Figure 6C:
Figure 6B:
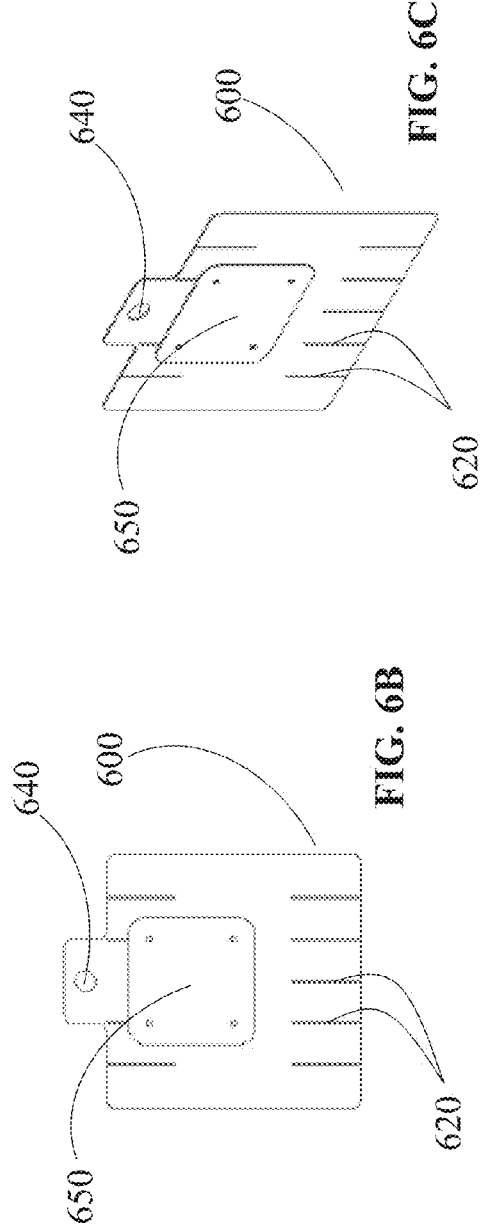

FIGS. 6A, 6B, AND 6C illustrate a patch attached to the screen, with an actuator attachment area outside of the screen surface area. As illustrated in FIGS. 6A, 6B, and 6C, the mounting patch 600 is attached to a screen substrate 610 and the mounting patch 600 also includes an area for attaching an actuator 650. FIGS. 6A, 6B, and 6C illustrate different view of the mounting patch 600. The active area or viewing area of the screen may be maximized by oversizing the mounting patch to allow attachment of the actuator substantially outside of the visible area of the screen as shown in FIGS. 6A, 6B, and 6C. The mounting patch 600 is similar to previously discussed mounting patches as the mounting patch 600 also includes strain relief features and an attachment element 640 which is in the shape of a hole.

In one embodiment, mechanical vibration may be applied to the screen in order to eliminate speckle. The mounting patches may be used as attachment points for the actuators. The patch may be pre-drilled for screws or punched/drilled at the screen installation. The actuator can be installed directly on the surface of the screen as shown in FIGS. 6A, 6B, and 6C. Additionally, the actuators may be attached to the mounting patches by gluing magnets to the patches and attaching the actuators to the magnets.

FIGS. 6A, 6B, and 6C are schematic diagrams illustrating one embodiment of a mounting patch with area for mounting a mechanical actuator external to a substrate. In one example, the patch may accommodate the installation of the actuator proximate to the screen surface as illustrated in FIGS. 6A, 6B, and 6C. Additionally, as shown in FIGS. 6A, 6B, and 6C, although the actuator may be proximate to the screen surface, the screen perimeter may have masking that may hide the screen perimeter region with the actuator so that the actuator may not be visible from the front of the screen. In this example, the spacing and the number of slits or notches in the patches may also depend on the appropriate propagation of the vibration from the actuator through the screen substrate.

Figure 7:
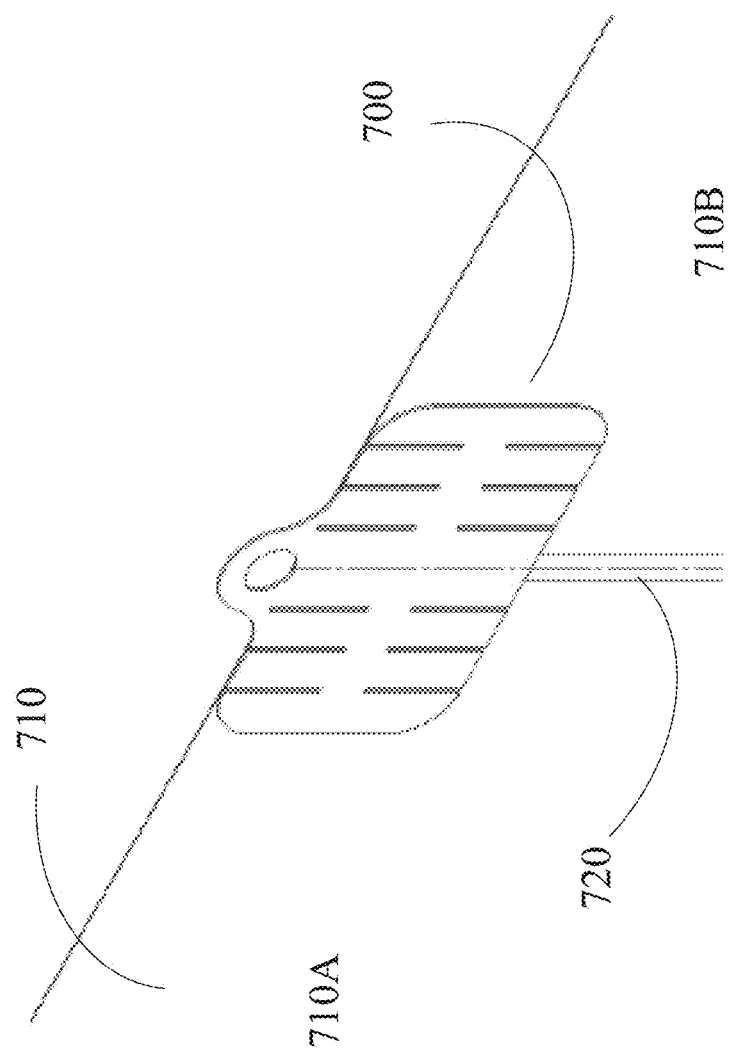
FIG. 7 is a schematic diagram illustrating an embodiment of a strain relieved patch that is placed over a screen seam to reinforce the seam; in accordance with the present disclosure.

The location of the patches on the screen may be sufficiently close to one another such that when the screen is mounted on a curved frame the screen closely follows the curvature of the frame. For typical frame radii found in cinema applications, approximately 6-12 inches of separation between mounting points or mounting patches center to center, may be sufficient. It may also be beneficial to locate the patches on top of or overlapping with the screen seams. Doing so may reinforce the seams at the screen edges as shown in FIG. 7. The patches may be located both over the seams and also in the area between each of the seams on the substrate.

FIG. 7 is a schematic diagram illustrating one embodiment of a strain relieved patch that is placed over a screen seam to reinforce the seam. Further, FIG. 7 illustrates a mounting patch 700 attached to a screen substrate 710 located on top of a screen seam 720 at the screen edge. The screen seam 720 is a result of a first screen substrate 710A and a second screen substrate 710B being placed adjacent to one another to create a screen seam 720. The screen seam 720 may join the first and second screen substrates 710A and 710B, respectively, by a butt joint or any other appropriate joining method. Although in FIG. 7 the patch is centered over the top of the screen seam, the patch may be located off center with respect to the screen seam. Again, the mounting patch 700 includes strain relief notches and an attachment element. The attachment element is not overlapping the screen substrate for the purposes of discussion only and not of limitation. The attachment element, as previously discussed may overlap the screen substrate and the hole may pass through both the mounting patch and the screen substrate.

Figure 8B:
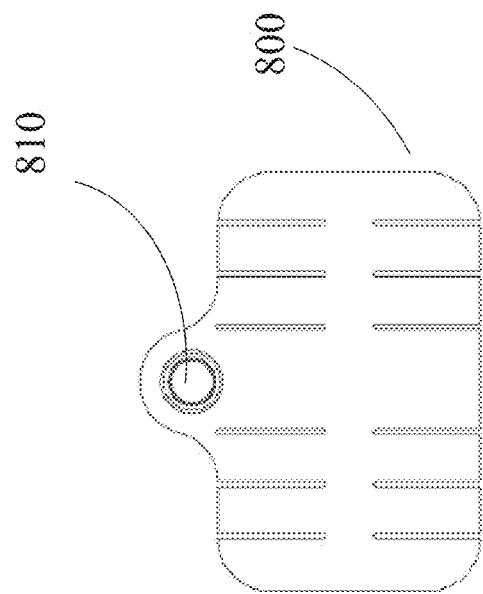
FIGS. 8A and 8B are schematic diagrams illustrating an embodiment of a strain relieved patch that incorporates a grommet to reinforce the attachment point, in accordance with the present disclosure.
Figure 8A:
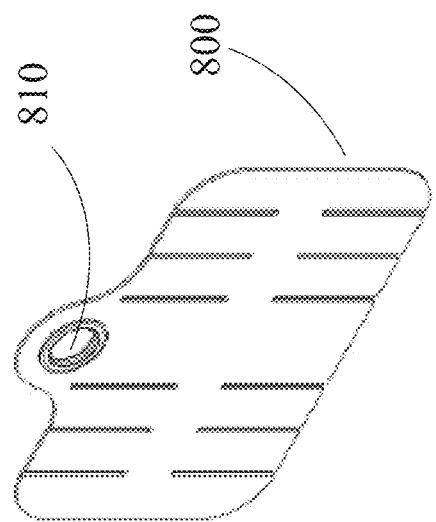

While a patch thickness of approximately five times the film thickness may typically be sufficient to distribute the point attachment load over the screen, the material may be too brittle to form a reliable attachment point. In this example, grommets can be either mechanically attached to the patch as shown in FIGS. 8A and 8B or adhesively bonded to the patch. FIGS. 8A and 8B are schematic diagrams illustrating one embodiment of a strain relieved patch that incorporates a grommet to reinforce the attachment point. FIGS. 8A and 8B illustrate different perspectives of the mounting patch 800. FIGS. 8A and 8B illustrate a mounting patch 800 with an attachment element that includes a grommet 810. The grommet material may be made from a wide variety of materials including metals, thicker plastics, rubbers, any combination thereof, and so forth. Furthermore, a grommet may be used to reinforce the attachment point in both cases in which the attachment point overlaps the screen substrate or if the attachment point is outside of the surface area of the screen substrate.

Figure 9B:
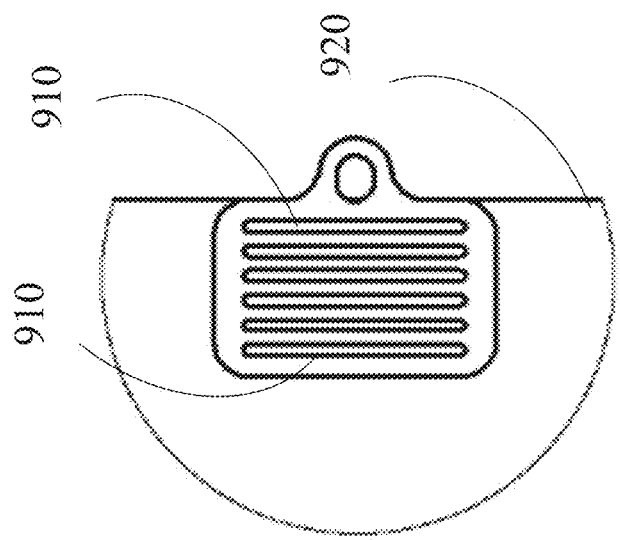
FIG. 9B is a schematic diagram illustrating an embodiment of a strain relieved patch for mounting on the vertical edge of a screen, in accordance with the present disclosure.
Figure 9A:
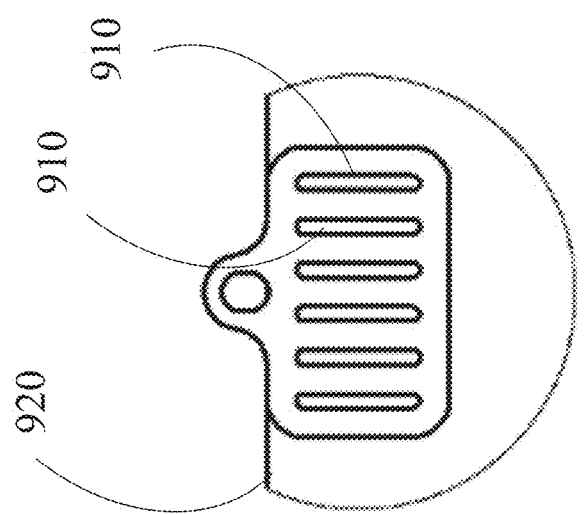
FIG. 9A is a schematic diagram illustrating an embodiment of a strain relieved patch for mounting on the horizontal edge of a screen, in accordance with the present disclosure.

FIG. 9A is a schematic diagram illustrating an embodiment of a strain relieved patch for mounting on the horizontal edge of a screen and FIG. 9B is a schematic diagram illustrating an embodiment of a strain relieved patch for mounting on the vertical edge of a screen. As illustrated in FIGS. 9A and 9B, the strain relief notches are elongated in different directions with respect to the edge of the screen. In FIG. 9A, the strain relief notches 910 are approximately normal to the screen edge 920 and in FIG. 9B, the strain relief notches 910 are approximately parallel to the screen edge 920. As previously discussed, the strain relief notches may be elongated from the edge of the mounting patch and extend toward the center of the patch, or the strain relief notch may be located toward the center of the patch and the notches may not extend to the edges of the patch. In one embodiment, the strain relief notches may be approximately perpendicular to the direction that the screen is rolled onto a core as illustrated in FIG. 2.

Figure 10B:
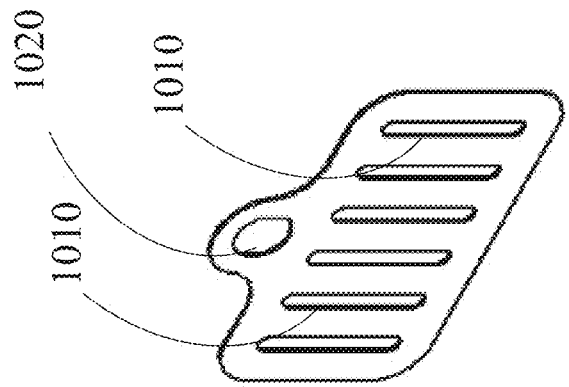
FIGS. 10A and 10B are schematic diagrams illustrating an embodiment of a strain relieved patch for mounting on the horizontal edge of a screen, in accordance with the present disclosure.
Figure 10A:
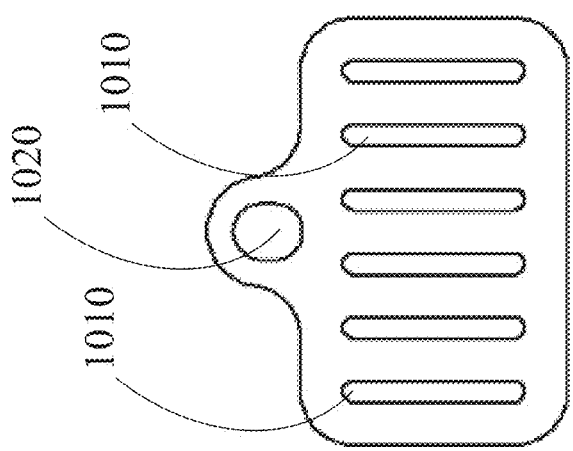

FIGS. 10A and 10B are schematic diagrams illustrating an embodiment of a strain relieved patch for mounting on the horizontal edge of a screen. As previously discussed, the slits or notches 1010 may be located toward the center of the mounting patch and may not extend to the edges of the patch. In one embodiment, there may not be an attachment feature or hole 1020, and the spring or cord may attach through one or more of the notches.

Figure 11A:
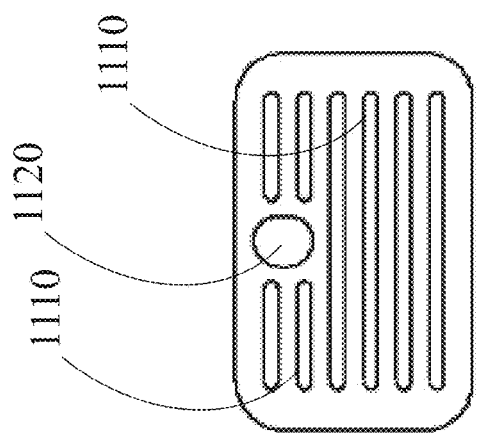
FIGS. 11A and 11B are schematic diagrams illustrating an embodiment of a strain relieved patch for mounting on the vertical edge of a screen, in accordance with the present disclosure.
Figure 11B:
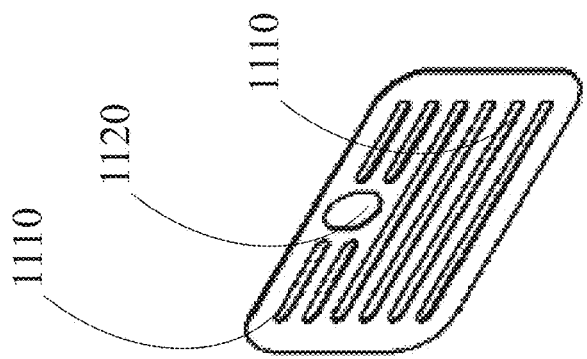
Figure 12A:
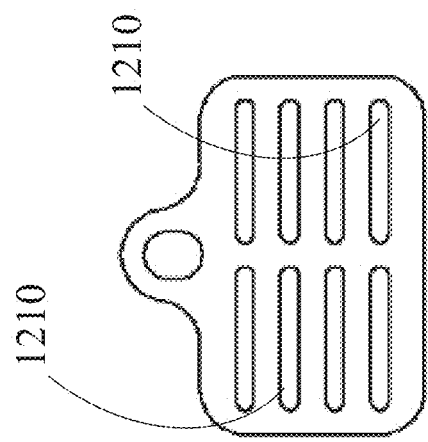
FIGS. 12A and 12B are schematic diagrams illustrating an embodiment of a strain relieved patch for mounting on the vertical edge of a screen, in accordance with the present disclosure.
Figure 12B:
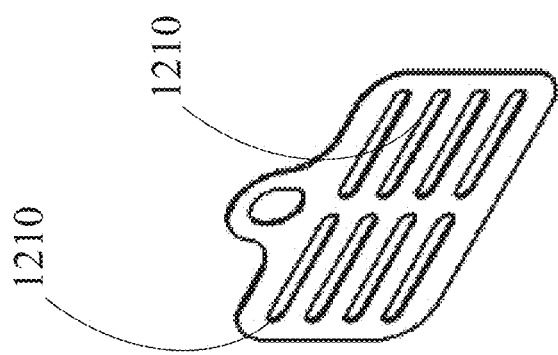

FIGS. 11A and 11B are schematic diagrams illustrating an embodiment of a strain relieved patch for mounting on the vertical edge of a screen. Similar to FIGS. 10A and 10B, the strain relief notches 1110 may be located toward the center of the patch and may not extend to the edges of the patch. Furthermore, the strain relief notches are oriented in a direction that is approximately perpendicular to the direction in which a screen may be rolled onto a core. As previously discussed, attachment hole 1120 may overlap the screen substrate as illustrated in FIGS. 11A and 11B. Similar to FIGS. 11A and 11B, FIGS. 12A and 12B are schematic diagrams illustrating an embodiment of a strain relieved patch for mounting on the vertical edge of a screen. FIGS. 12A and 12B illustrate yet another possible configuration of the strain relief notches 1210 or slits.

It should be noted that embodiments of the present disclosure may be used in a variety of optical systems and projection systems. The embodiment may include or work with a variety of projectors, projection systems, optical components, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

It should be understood that the disclosure is not limited in its application or creation to the details of the particular arrangements shown, because the embodiments disclosed herein are capable of other embodiments. Moreover, aspects of the embodiments may be set forth in different combinations and arrangements to define embodiments unique in their own right. Also, the terminology used herein is for the purpose of description and not of limitation.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A projection screen, comprising:
    a first substrate and a second substrate, wherein each of the first substrate and the second substrate have at least a first seaming edge and a first mounting edge, further wherein the first seaming edge of the first substrate is joined together with the first seaming edge of the second substrate to form a seam;
    a first mounting patch attached to at least the first substrate, wherein the first mounting patch has at least one strain relief element, wherein the strain relief element reduces strain about a vertical axis, wherein the first mounting patch distributes a mechanical load across at least the first substrate so that the strain lines in the first substrate are optically at or around a just noticeable difference, further wherein the first mounting patch has a first edge that approximately aligns with at least the mounting edge of the first substrate.

2. The projection screen of claim 1, wherein the first mounting patch further comprises:
    an attachment feature that attaches a mechanical load to at least the first substrate, wherein the attachment feature is a hole through the first mounting patch.

3. The projection screen of claim 2, wherein the attachment feature of the first mounting patch does not overlap the first substrate panel.

4. The projection screen of claim 1, wherein the first mounting patch is mounted on the back side of the first substrate panel.

5. The projection screen of claim 1, wherein the first mounting patch is a substantially similar material to the first and second substrate panels.

6. The projection screen of claim 1, wherein the first and second substrate panels are PET.

7. The projection screen of claim 1, wherein the first mounting patch is PET.

8. The projection screen of claim 1, wherein the coefficient of thermal expansion of the first mounting patch is within approximately 10-15 percent of the coefficient of thermal expansion of the first and second substrate panels.

9. The projection screen of claim 1, further comprising a second mounting patch attached to and overlapping the seam formed by joining the first substrate panel and the second substrate panel.

10. The projection screen of claim 1, further comprising a third mounting patch which attaches to the second seaming edge opposite the first seaming edge of the first substrate panel.

11. The projection screen of claim 10, wherein the fasteners attach to the third mounting patch and place the first substrate panel under a mechanical load in an approximately horizontal direction.

12. The projection screen of claim 1, wherein the first mounting patch thickness is at least approximately 2.5 times stiffer in plane than the first substrate panel.

13. A strain relieved patch for attachment to a projection screen, comprising:
    a substrate;
    strain relief features for reducing strain in the substrate of the strain relieved patch around an approximately vertical axis while substantially maintaining in plane rigidity;
    an attachment feature that allows attachment of a mechanical load, wherein the strain relieved patch approximately evenly distributes a mechanical load applied to the attachment feature; and an adhesive affixed to the strain relieved patch for mounting the strain relieved patch to a substrate; and wherein the strain relief features score a surface of the strain relieved patch and do not pass completely through the strain relieved patch.

14. The strain relieved patch for attachment to a projection screen of claim 13, wherein the attachment feature is approximately circular and forms a hole through the strain relieved patch.

15. The strain relieved patch for attachment to a projection screen of claim 13, wherein the strain relief features are elongated features.

16. The strain relieved patch for attachment to a projection screen of claim 15, wherein the strain relief features form an elongated hole through the strain relieved patch.

17. The strain relieved patch for attachment to a projection screen of claim 13, wherein the strain relief features are elongated and are located on the top and the bottom edges of the strain relieved patches.

18. The strain relieved patch for attachment to a projection screen of claim 17, wherein the strain relief features on the top of the substrate are offset from the strain relief features on the bottom of the substrate.

19. The strain relieved patch for attachment to a projection screen of claim 13, wherein the strain relief features are centered toward the approximately vertical middle of the strain relieved patch and do not extend to the edges of the strain relieved patch.

20. The strain relieved patch for attachment to a projection screen of claim 13, wherein the strain relief features reduce the tensile stiffness of the strain relieved patch by less than approximately 40 percent when compared to a similar patch without strain relief features.

21. The strain relieved patch for attachment to a projection screen of claim 13, wherein the strain relief features reduce the bending stiffness of the strain relieved patch in the approximate range of 50-90 percent when compared to a similar patch without strain relief features.

22. The strain relieved patch for attachment to a projection screen of claim 13, wherein the substrate is PET.

23. The strain relieved patch for attachment to a projection screen of claim 13, wherein the thickness of the substrate is in the approximate range of 10-80 mils thick.

24. The strain relieved patch for attachment to a projection screen of claim 13, wherein the adhesive is an ultra violet crosslinking adhesive.

25. The strain relieved patch for attachment to a projection screen of claim 13, wherein the attachment feature is reinforced with a grommet.

26. The strain relieved patch for attachment to a projection screen of claim 25, wherein the grommet is metal.

* * * * *